(12) United States Patent
Wang

(10) Patent No.: US 7,934,088 B2
(45) Date of Patent: Apr. 26, 2011

(54) METHOD OF SECURE COMMUNICATION BETWEEN ENDPOINTS

(75) Inventor: Qi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 889 days.

(21) Appl. No.: 11/587,562

(22) PCT Filed: Mar. 31, 2005

(86) PCT No.: PCT/CN2005/000422
§ 371 (c)(1),
(2), (4) Date: Jul. 30, 2007

(87) PCT Pub. No.: WO2005/104423
PCT Pub. Date: Nov. 3, 2005

(65) Prior Publication Data
US 2007/0288744 A1    Dec. 13, 2007

(30) Foreign Application Priority Data

Apr. 26, 2004  (CN) .......................... 2004 1 0036781

(51) Int. Cl.
*H04L 29/06* (2006.01)
*H04L 9/32* (2006.01)
*H04L 9/00* (2006.01)
*G06F 7/04* (2006.01)
*G06Q 20/00* (2006.01)

(52) U.S. Cl. .......... 713/153; 713/171; 726/12; 380/260; 705/79

(58) Field of Classification Search .................. 713/153, 713/171
See application file for complete search history.

(56) References Cited

U.S. PATENT DOCUMENTS

| | | | |
|---|---|---|---|
| 6,247,129 B1* | 6/2001 | Keathley et al. | 713/156 |
| 6,681,017 B1* | 1/2004 | Matias et al. | 380/277 |
| 6,775,253 B1* | 8/2004 | Agrawal et al. | 370/329 |
| 6,996,716 B1* | 2/2006 | Hsu | 713/175 |
| 7,242,766 B1* | 7/2007 | Lyle | 380/2 |
| 7,324,645 B1* | 1/2008 | Juopperi et al. | 380/247 |
| 7,353,388 B1* | 4/2008 | Gilman et al. | 713/168 |
| 2002/0023216 A1* | 2/2002 | Noguchi et al. | 713/171 |
| 2002/0178370 A1* | 11/2002 | Gurevich et al. | 713/189 |

(Continued)

FOREIGN PATENT DOCUMENTS

| | | |
|---|---|---|
| CN | 1347605 A | 1/2002 |
| EP | 1 229 708 A2 | 8/2002 |

OTHER PUBLICATIONS

International Search Report from International Patent Application PCT/CN2005/000422 completed, May 24, 2005.

(Continued)

*Primary Examiner* — Taghi T. Arani
*Assistant Examiner* — Morshed Mehedi

(57) ABSTRACT

The method of secure communication between the endpoints is used for the secret communication between endpoints locating in different gatekeeper management area, and the method includes: in the process of the caller endpoint calling the callee endpoint, the home gatekeeper of the callee endpoint generates the share secret key between the caller endpoint and the callee endpoint; the secure communication process is performed between the caller endpoint and the callee endpoint according to the share secret key. According to the secure communication method between the endpoints, the invention makes that secret communication mechanism between the endpoints locating the different gatekeeper management area has better expansibility and higher efficiency.

17 Claims, 2 Drawing Sheets

U.S. PATENT DOCUMENTS

| | | | |
|---|---|---|---|
| 2003/0097558 A1* | 5/2003 | England et al. | 713/155 |
| 2003/0123434 A1* | 7/2003 | Hirayama et al. | 370/352 |
| 2003/0154408 A1* | 8/2003 | Zhu et al. | 713/201 |
| 2003/0217165 A1* | 11/2003 | Buch et al. | 709/229 |
| 2005/0163316 A1* | 7/2005 | Wing | 380/257 |

OTHER PUBLICATIONS

H. Xiaoqin, L. Tao, W. Liangfu, L. Minyu and Z. Hui, "Design & Implementation of Security Telephone Based on PSTN," *Communications Technology*, Nov. 12, 2003, 3 pages, No. 144.

* cited by examiner

METHOD OF SECURE COMMUNICATION BETWEEN ENDPOINTS

FIELD OF THE INVENTION

The present invention relates to information security, in particular to a method of secure communication between different endpoints in a communication system.

BACKGROUND OF THE INVENTION

An H.323 protocol based multimedia communication system is implemented on the basis of Packet Based Network (PBN) without Quality of Service (QOS) assurance. Due to the intrinsic technical nature of PBN, a PBN is usually unable to assure QOS, and thereby unable to provide secure QOS for communication between endpoints in such network system.

In order to provide timely secure communication service on such an insecure network system, the following two issues have to be taken into consideration in communication between different endpoints: authentication and privacy.

Though some authentication and privacy techniques for H.323 protocol based multimedia communication systems have been defined in predecessors of H.235 protocol V3, those techniques were technical solutions in Gate Keeper (GK) routing mode (a routing mode for H.323-based communication systems, the core of which is to utilize GK to forward call signaling between different endpoints). Furthermore, Appendix I of H.235 V3 puts forth an authentication and privacy technique based on direct routing mode (direct routing mode is another routing mode that is used in H.323-based communication systems; in contrast to above GK routing mode, direct routing mode doesn't utilize GK to forward call signaling between different end points, instead, the two endpoints involved in communication exchange call signaling with each other directly); however, when such an authentication and privacy technique based on direct routing mode utilizes basic features defined in Appendix D and Appendix F of H.235 V3 to provide secure communication service for an H.323-based communication system, it is limited that the different endpoints involved in communication must managed by the same GK, i.e., it is required that the endpoints should be in the same GK management domain in the network system; therefore, it imposes severe constraint to actual application.

Appendix I of supplement Amd1 to H.235 V3, which was issued by ITU-T recently, revised the Appendix I of above H.235 V3 with an authentication and privacy technique across different GK management domains (management across GKs means that the calling endpoint and the called endpoint are in different GK management domains, and the calling endpoint need to locate the called endpoint with assist of the home GK of the calling endpoint and the home GK of the called endpoint) and based on direct routing mode, to provide secure communication service in case that the endpoints involved in communication are in different GK management domains.

Hereinafter is described in brief the secure communication service processing procedures in prior art for communication between endpoints in different GK management domains in a multimedia communication system on the basis of direct routing mode, with reference to FIG. 1. As shown in the modular block diagram of H.323-based network system in FIG. 1, the calling End Point a (EPa) and the called End Point b (EPb) are two different endpoints; wherein, gate keeper GKg is the home GK of EPa, and gate keeper GKh is the home GK of EPb. Here, the authentication and privacy technique across different GK management domains and based on direct routing mode presets a shared key Kag between EPa and GKg as well as a shared key Kbh between EPb and GKh, so that EPa and GKg authenticate each other with Kag and EPb and GKh authenticate each other with Kbh; meanwhile, a shared key (Kgh) between GKg and GKh is also set, so that GKg and GKh authenticates each other with Kgh. On the basis of above set conditions, the secure communication processing procedures between EPa and EPb are as follows:

1. When prepares for calling EPb, EPa sends a call Admissions Request (ARQ) message containing EPb identification information to GKg, to request for admission.

2. After receiving the ARQ message, GKg finds the home GK of EPb is GKh with the EPb identification information contained in the ARQ message, and sends a Location Request (LRQ) message to GKh.

3. After receiving the LRQ message, GKh generates a random sequence Challenge and an initialization vector IV, and then carries out encryption operation on Kbh (the shared key between EPb and GKh) with the generated random sequence Challenge to obtain the derived keys EKbh and KSbh; similarly, GKh carries out encryption operation on Kgh (the shared key between GKg and GKh) with the random sequence Challenge to obtain the derived keys EKgh and KSgh; wherein, in each of above encryption operations on shared keys with the random sequence Challenge, two derived keys are generated correspondingly in case that the random sequence Challenge is preceded by different data tags;

Next, GKh utilizes the generated initialization vector IV to carry out encryption operation on the derived keys Ekbh, KSbh, EKgh, and KSgh as follows to obtain:

$ENC_{EKgh, KSgh, IV}(EKbh)$, which indicates EKbh is encrypted by EKgh and KSgh on the basis of IV initialization vector;

$ENC_{EKgh, KSgh, IV}(KSbh)$, which indicates KSbh is encrypted by EKgh and KSgh on the basis of IV initialization vector;

Then, GKh creates a Location Confirm (LCF) message, stores the above $ENC_{EKgh, KSgh, IV}(EKbh)$ and $ENC_{EKgh, KSgh, IV}(KSbh)$ into the respective fields of the clear token Clear Token contained in the LCF message, and stores the random sequence Challenge, initialization vector IV, and the corresponding algorithm information into the respective fields of the clear token Clear Token, and finally feeds the LCF massage back to GKg.

4. After receiving the LCF message, GKg reads the Challenge, IV, and the corresponding algorithm information in the respective fields of the clear token Clear Token in the LCF message to decrypt $ENC_{EKgh, KSgh, IV}(EKbh)$ and $ENC_{EKgh, KSgh, IV}(KSbh)$ to obtain EKbh and KSbh;

Afterwards, GKg generates its own random sequence Challenge and initialization vector IV as well as a shared key Kab between EPa and EPb; with the same principle as described above, GKg carries out encryption for Kab with the generated random sequence Challenge, initialization vector IV, Kag (the shared key between EPa and GKg), and EKbh and KSbh as follows:

$EKab1 = ENC_{EKag, KSag, IV}(Kab)$; and $EKab2 = ENC_{EKbh, KSbh, IV}(Kab)$;

Next, GKg creates two clear tokens Clear Token a and Clear Token b, hereinafter referred to as CTa and CTb; GKg sets its own Challenge, IV, EKab1 obtained by encryption, and the corresponding algorithm information into the respective fields of CTa; and sets its own Challenge, IV, Ekab2 obtained by encryption, and the corresponding algorithm information into the respective fields of CTb;

Finally, GKg sets CTa and CTb into the created call Admissions Confirm (ACF) message simultaneously, and feeds the ACF message back to EPa.

5. After receiving the ACF message, EPa reads the Challenge, IV, and the corresponding algorithm information in the respective fields of clear token CTa in the ACF message, carries out operation on Kag with the Challenge and IV by the algorithm information to obtain EKag and KSag, and then decrypts EKab1=ENC$_{EKag, KSag, IV}$(Kab) with the obtained EKag, KSag, and IV to obtain Kab;

EPa creates a Setup message, copies the clear token CTb in the received ACF message to the Setup message completely, and utilizes Kab obtained in above decryption process to set authentication information in the Setup message, and then sends the Setup message to EPb;

After receiving the Setup message from EPa, EPb processes as follows:

It reads the Challenge, IV, and the corresponding algorithm information in the respective fields of CTb in the Setup message, carries out operation on Kbh with the Challenge and IV by the algorithm information to obtain EKbh and KSbh, and then decrypts Ekab2=ENC$_{EKbh, KSbh, IV}$(Kab) with the obtained EKbh, KSbh, and IV to obtain Kab;

EPb utilizes the Kab obtained through decryption to authenticate the received Setup message.

In the subsequent communication process between EPa and EPb, EPa and EPb encrypts communication information with key data Kab generated above by GKg, and the counterpart utilizes Kab to authenticate the received message, so that the secure communication mechanism is achieved when communicate between two endpoints in different GK management domains.

It can be seen from the above authentication and privacy technique across different GK management domains and based on direct routing mode in actual implementation that:

(1) The shared key Kab between calling endpoint EPa and called endpoint EPb is generated by the home gate keeper GKg of the calling endpoint EPa, and the called endpoint EPb has to accept that shared key Kab passively, even though the called endpoint EPb doesn't trust the shared key Kab; therefore, for the called endpoint EPb, the flexibility is restricted.

(2) In above step 4, the key Kab is encrypted by GKg when GKg creates the clear token CTb; however, when EPb receives the Setup message, it has to decrypt the encrypted part of the clear token CTb contained in the Setup message to obtain Kab; therefore, the algorithm used at GKg side to encrypt the key Kab is required to be consistent with that used at EPb side to decrypt CTb to obtain the key Kab; as the result, for endpoints in different GK management ranges, a consistent algorithm have to be used between different endpoints, which degrades the expansibility of such secure communication mechanism.

(3) In above step 3 and 4, the derived keys (EKbh and KSbh, respectively) between the called endpoint EPb and the home gate keeper GKh of the called endpoint EPb have to be transmitted between the home gate keeper GKg of the calling endpoint EPa and the home gate keeper GKh of the called endpoint EPb; as the result, the two derived keys have to be encrypted twice at GKh side when they are transmitted between GKg and GKh, and correspondingly they have to be decrypted twice at GKg side; resulting in degraded processing efficiency of the secure communication mechanism.

SUMMARY OF THE INVENTION

The embodiments of the present invention provide a method of secure communication between endpoints, in which the home gate keeper of the called endpoint generates a shared key necessary for secure communication between the endpoints, in order to improve the expansibility and processing efficiency of the mechanism of the secure communication between endpoints.

A method of secure communication between endpoints, for secure communication between endpoints in different gate keeper management domains according to an embodiment of the present invention includes:

generating, by a home gate keeper of a called endpoint, a shared key between a calling endpoint and the called endpoint when the calling endpoint is calling the called endpoint;

performing communication between the calling endpoint and the called endpoint based on the shared key.

Wherein the process of generating a shared key between a calling endpoint and the called endpoint further includes:

sending an Admissions Request message containing the identification information of the called endpoint by the calling endpoint to its own home gate keeper;

generating, by the home gate keeper of the calling endpoint, a Location Request message containing the identification information of the called endpoint based on the identification information of the called endpoint contained in the Admissions Request message and sending the Location Request message to the home gate keeper of the called endpoint; and upon receiving the Location Request message, generating by the home gate keeper of the called endpoint, the shared key between the calling endpoint and the called endpoint.

Wherein, the method further includes between the process of generating a shared key between a calling endpoint and the called endpoint and the process of performing communication:

encrypting the shared key between the calling endpoint and the called endpoint and transmitting the encrypted shared key to the calling endpoint, by the home gate keeper of the called endpoint; encrypting, by the calling endpoint, a Setup message addressed to the called endpoint by using the shared key; and encrypting the shared key between the calling endpoint and the called endpoint and transmitting the encrypted shared key to the called endpoint, by the home gate keeper of the called endpoint; authenticating, by the called endpoint, the Setup message sent from the calling endpoint by using the shared key.

Wherein, the process of encrypting the shared key and transmitting the encrypted shared key to the calling endpoint by the home gate keeper of the called endpoint; encrypting, by the calling endpoint, a Setup message addressed to the called endpoint by using the shared key further includes:

encrypting the shared key between the calling endpoint and the called endpoint in a first encryption mode, and sending the encrypted data to the home gate keeper of the calling endpoint by the home gate keeper of the called endpoint;

decrypting, by the home gate keeper of the calling endpoint, the received encrypted data in a first decryption mode to obtain the shared key between the calling endpoint and the called endpoint;

encrypting the shared key between the calling endpoint and the called endpoint in a second encryption mode, and sending the encrypted data to the calling endpoint, by the home gate keeper of the calling endpoint; and decrypting, by the calling endpoint, the received encrypted data in a second decryption mode to obtain the shared key between the calling endpoint and the called endpoint.

Wherein the method further includes before the process of generating a shared key between a calling endpoint and the called endpoint:

presetting a shared key between the home gate keeper of the calling endpoint and the home gate keeper of the called endpoint; and presetting a first key derivation algorithm and a first encryption algorithm by the home gate keeper of the called endpoint;

the process of encrypting the shared key in a first encryption mode, and sending the encrypted data to the home gate keeper of the calling endpoint by the home gate keeper of the called endpoint further includes:

generating a first random sequence and a first clear token by the home gate keeper of the called endpoint;

encrypting the shared key between the home gate keeper of the calling endpoint and the home gate keeper of the called endpoint with the first random sequence on the basis of the first key derivation algorithm, to obtain a first derived key;

encrypting the shared key between the calling endpoint and the called endpoint with the first derived key on the basis of the first encryption algorithm, to obtain a first encryption result;

setting the first encryption result, the first random sequence, the first key derivation algorithm and the first encryption algorithm into respective fields of the first clear token; and encapsulating the first clear token into a Location Confirm message, and feeding the encapsulated first clear token back to the home gate keeper of the calling endpoint.

Wherein, the process of decrypting by the home gate keeper of the calling endpoint the received encrypted data in a first decryption mode to obtain the shared key between the calling endpoint and the called endpoint further includes:

reading, by the home gate keeper of the calling endpoint, the first encryption result, the first random sequence, the first key derivation algorithm and the first encryption algorithm from the respective fields of the first clear token in the Location Confirm message;

encrypting the shared key between the home gate keeper of the calling endpoint and the home gate keeper of the called endpoint with the first random sequence on the basis of the first key derivation algorithm, to obtain a first derived key; and decrypting the first encryption result with the first derived key on the basis of the first encryption algorithm, to obtain the shared key between the calling endpoint and the called endpoint.

Wherein the method further includes before the process of generating a shared key between a calling endpoint and the called endpoint:

presetting a shared key between the calling endpoint and the home gate keeper of the calling endpoint; and presetting a second key derivation algorithm and a second encryption algorithm by the home gate keeper of the calling endpoint;

the process of encrypting the shared key between the calling endpoint and the called endpoint in a second encryption mode, and sending the encrypted data to the calling endpoint, by the home gate keeper of the calling endpoint further includes:

generating a second random sequence and a second clear token by the home gate keeper of the calling endpoint;

encrypting the shared key between the calling endpoint and the home gate keeper of the calling endpoint with the second random sequence on the basis of the second key derivation algorithm, to obtain a second derived key;

encrypting the shared key between the calling endpoint and the called endpoint with the second derived key on the basis of the second encryption algorithm, to obtain the second encryption result;

setting the second encryption result, the second random sequence, the second key derivation algorithm and the second encryption algorithm into respective fields of the second clear token; and encapsulating the second clear token into an Admissions Confirm message, and feeding the Admissions Confirm message back to the calling endpoint.

Wherein, the process of decrypting, by the calling endpoint, the received encrypted data in a second decryption mode to obtain the shared key between the calling endpoint and the called endpoint further includes:

reading the second encryption result, the second random sequence, the second key derivation algorithm and the second encryption algorithm recorded in the respective fields of the second clear token in the Admissions Confirm message, by the calling endpoint;

encrypting the shared key between the calling endpoint and the home gate keeper of the calling endpoint with the second random sequence on the basis of the second key derivation algorithm, to obtain the second derived key; and decrypting the second encryption result with the second derived key on the basis of the second encryption algorithm, to obtain the shared key between the calling endpoint and the called endpoint.

Wherein, the process of encrypting the shared key between the calling endpoint and the called endpoint and transmitting the encrypted shared key to the called endpoint by the home gate keeper of the called endpoint and authenticating by the called endpoint the Setup message sent from the calling endpoint by using the shared key further includes:

encrypting the shared key between the calling endpoint and the called endpoint in a third encryption mode, and sending the encrypted data to the home gate keeper of the calling endpoint, by the home gate keeper of the called endpoint;

forwarding the encrypted data to the calling endpoint by the home gate keeper of the calling endpoint;

forwarding the encrypted data to the called endpoint by the calling endpoint; and decrypting the received encrypted data in a third decryption mode by the called endpoint, to obtain the shared key between the calling endpoint and the called endpoint.

Wherein before the process of generating a shared key between a calling endpoint and the called endpoint, the method further includes:

presetting a shared key between the called endpoint and the home gate keeper of the called endpoint; and presetting a third key derivation algorithm and a third encryption algorithm by the home gate keeper of the called endpoint;

wherein the process of encrypting the shared key between the calling endpoint and the called endpoint in a third encryption mode and sending the encrypted data to the home gate keeper of the calling endpoint by the home gate keeper of the called endpoint further includes:

generating a third random sequence and a third clear token by the home gate keeper of the called endpoint;

encrypting the shared key between the called endpoint and the home gate keeper of the called endpoint with the third random sequence on the basis of the third key derivation algorithm, to obtain a third derived key;

encrypting the shared key between the calling endpoint and the called endpoint with the third derived key on the basis of the third encryption algorithm, to obtain the third encryption result;

setting the third encryption result, the third random sequence, the third key derivation algorithm and the third encryption algorithm into respective fields of the third clear token; and encapsulating the third clear token into a Location Confirm message, and feeding the Location Confirm message back to the home gate keeper of the calling endpoint.

Wherein, the process of forwarding the encrypted data to the calling endpoint by the home gate keeper of the calling endpoint is performed by encapsulating the third clear token contained in the received Location Confirm message into the Admissions Confirm message which is fed back to the calling endpoint;

wherein, the process of forwarding the encrypted data to the called endpoint by the calling endpoint is performed by encapsulating the third clear token contained in the received Admissions Confirm message into the Setup message which is fed back to the called endpoint.

The process of decrypting the received encrypted data in a third decryption mode by the called endpoint, to obtain the shared key between the calling endpoint and the called endpoint further includes:

reading the third encryption result, the third random sequence, the third key derivation algorithm and the third encryption algorithm recorded in the respective fields of the third clear token in the Setup message, by the called endpoint;

encrypting the shared key between the called endpoint and the home gate keeper of the called endpoint with the third random sequence on the basis of the third key derivation algorithm, to obtain the third derived key; and decrypting the third encryption result with the third derived key on the basis of the third encryption algorithm, to obtain the shared key between the calling endpoint and the called endpoint.

The method further includes between the process of generating a shared key between a calling endpoint and the called endpoint and the process of performing communication between the calling endpoint and the called endpoint based on the shared key:

sending a Setup message from the calling endpoint to the called endpoint;

authenticating the received Setup message with the shared key, and sending an Admissions Request message to its own home gate keeper in case that the authentication is passed, by the called endpoint;

feeding, by the home gate keeper of the called endpoint, an Admissions Confirm message back to the called endpoint in case of determining the called endpoint as an endpoint managed by itself according to the received Admissions Request message; and after receiving the Admissions Confirm message, sending an Alerting message and a Connect message from the called endpoint to the calling endpoint.

The process of performing communication between the calling endpoint and the called endpoint based on the shared key further includes:

encrypting the message addressed to the counterpart endpoint with the shared key by the calling endpoint or called endpoint; and authenticating the messages sent from the counterpart endpoint and checking the integrity of the message with the shared key.

The method further includes after the process of performing communication between the calling endpoint and the called endpoint based on the shared key: transmitting a Release Complete message between the calling endpoint and the called endpoint.

Compared to the prior art, the method of secure communication between endpoints according to an aspect of the present invention delivers the following benefits:

A. Due to the fact that the shared key required for secure communication between endpoints in different gate keeper management domains is generated by the home gate keeper of the called endpoint, the called endpoint can control all call admission authorities; therefore, the trust of the called endpoint to the shared key between the endpoints is enhanced;

B. The home gate keeper of the called endpoint encrypts the shared key between the endpoints twice, while the home gate keeper of the calling endpoint encrypts the shared key once; however, it is not mandatory that the three encryption operations should use the same encryption algorithm; therefore, the algorithm used by the home gate keeper of the calling endpoint in encryption of the shared key between the endpoints may be not consistent with that used by the called endpoint in decryption of the encrypted data to obtain the shared key between the endpoints; such an approach is favorable for expansion of the secure communication mechanism;

C. Since the derived key corresponding to the shared key between the called endpoint and the home gate keeper of the called endpoint is not needed to be transmitted between the home gate keeper of the calling endpoint and the home gate keeper of the called endpoint, the home gate keeper side of the called endpoint needs not to encrypt the derived key from the shared key between the called endpoint and the home gate keeper of the called endpoint; accordingly, the home gate keeper side of the calling endpoint needs not to decrypt the encrypted data to obtain the derived key corresponding to the shared key between the called endpoint and the home gate keeper of the called endpoint; therefore, the processing efficiency of the secure communication mechanism is improved.

DETAILED DESCRIPTION OF THE INVENTION

The method of secure communication between endpoints according to an embodiment of the present invention is mainly designed to implement secure communication between endpoints in different GK management domains in H.323-based multimedia communication system in direct routing mode. Compared to the prior art, the method of secure communication between endpoints according to an embodiment of the present invention is able to reduce the number of encryption/decryption operations between the home gate keeper of the calling endpoint and the home gate keeper of the called endpoint and support the home gate keeper management domain of the calling endpoints and the home gate keeper management domain of the called endpoint to employ different encryption/decryption algorithms, and the calling endpoint and the called endpoint to employ different encryption/decryption algorithms; the shared key between the calling endpoint and the called endpoint is generated by the home gate keeper of the called endpoint; whether to receive the call messages or not is fully controlled by the home gate keeper of the called endpoint and itself, so that it is free from the control of the home gate keeper of the calling endpoint and the called party can lay more trust on the shared key between the endpoints; such trust mechanism is crucial to operators.

In the method of secure communication between endpoints according to an embodiment of the present invention, for communication between endpoints (EPs) in different gate keeper (GK) management domains, when the calling endpoint calls the called endpoint, the home GK of the called endpoint generates a shared key between the calling endpoint and the called endpoint; the secure communication processing is carried out between the calling endpoint and the called endpoint with the shared key generated by the home GK of the called endpoint.

Wherein, the process that secure communication between the calling endpoint and the called endpoint is carried out with the shared key generated by the home GK of the called endpoint mainly includes:

The calling endpoint or called endpoint utilizes the shared key generated by the home GK of the called endpoint to encrypt the messages to be sent to the counterpart endpoint;

At the same time, the calling endpoint or called endpoint utilizes the shared key generated by the home GK of the called endpoint authenticates the messages sent from the counterpart endpoint and check the message's integrity.

Figure 1:
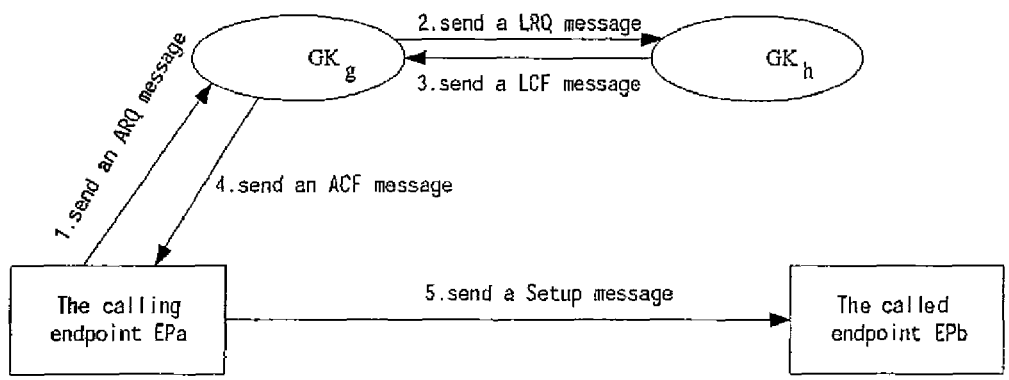
FIG. 1 shows the processing procedures of secure communication between endpoints in different GK management domains in direct routing mode in the prior art.
Figure 2:
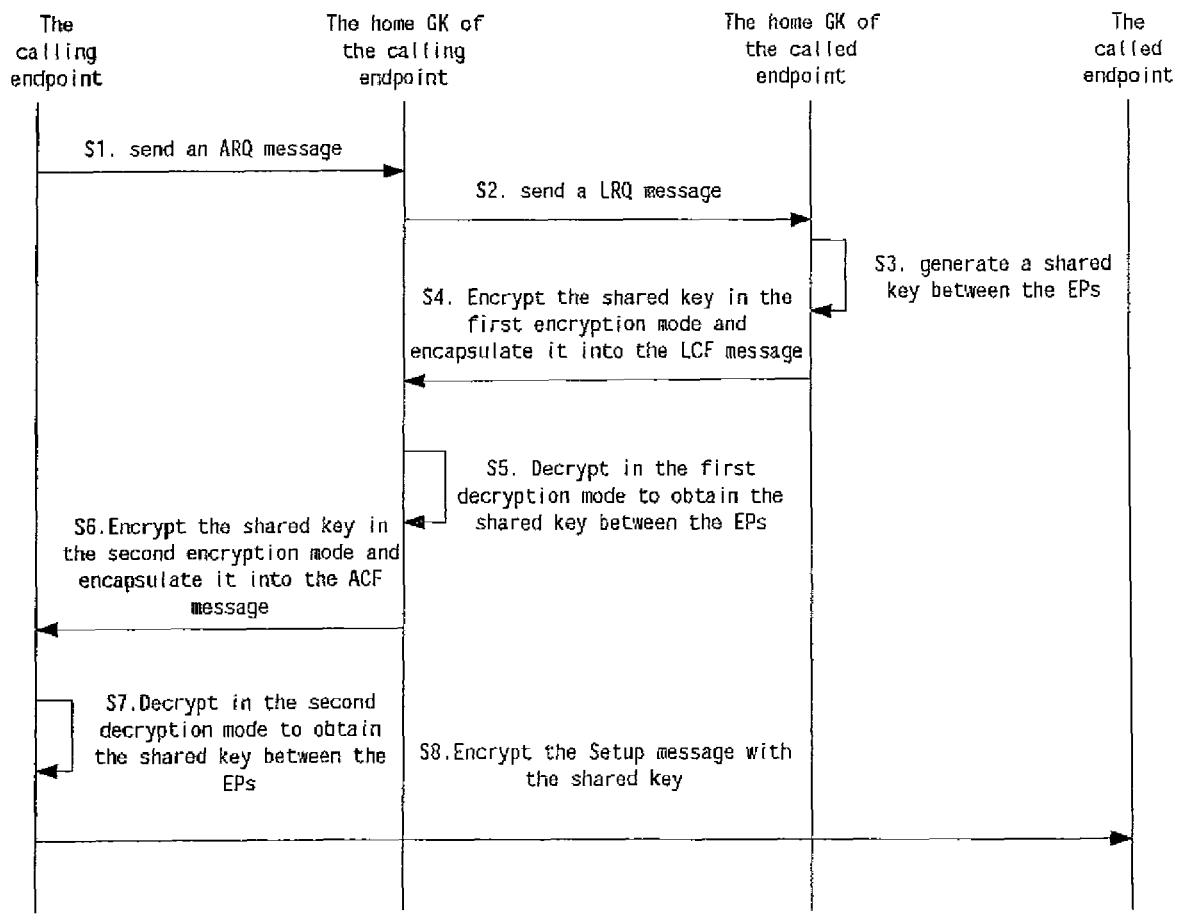
FIG. 2 shows the procedures that the home gate keeper of the called endpoint encrypts the shared key between the calling endpoint and the called endpoint and then sends the encrypted shared key to the calling endpoint, and the calling endpoint decrypts the encrypted data to obtain the shared key, according to an embodiment of the method of secure communication between endpoints of the present invention.

To achieve secure communication between above calling endpoint and called endpoint with the shared key generated by home GK of the called endpoint, the following two tasks need to be accomplished:

The home GK of the called endpoint shall encrypt the shared key between the calling endpoint and the called endpoint and then transmit the encrypted shared key to the calling endpoint; the calling endpoint in turn decrypts the encrypted shared key and utilizes it to encrypt the Setup message and subsequent service messages to be sent to the called endpoint; as shown in FIG. 2, showing, in the method of secure communication between endpoints according to an embodiment of the present invention, the procedures in which the home gate keeper of the called endpoint encrypts the shared key between the calling endpoint and the called endpoint and then transmits the encrypted shared key to the calling endpoint, and the calling endpoint in turn decrypts the encrypted data to obtain the corresponding shared key, the processing procedures are as follows:

Step S1: when the calling endpoint is to call an endpoint in a different GK management domain from itself, it generates an Admissions Request (ARQ) message containing called endpoint identification information and then sends the ARQ message to its own home GK;

Step S2: with the called endpoint identification information contained in the ARQ message, the home GK of the calling endpoint locates the GK management domain in which the called endpoint is, and generates a Location Request (LRQ) message containing called endpoint identification information and sends it to the home GK of the called endpoint;

Step S3: after the home GK of the called endpoint receives the LRQ message, it generates a shared key between the calling endpoint and the called endpoint;

Step S4: the home GK of the called endpoint encrypts the shared key between the calling endpoint and the called endpoint in the first encryption mode, and sends the encrypted data to the home gate keeper of the calling endpoint; in detail, the process that it encrypts the shared key between the calling endpoint and the called endpoint with the first encryption mode, and sends the encrypted data to the home gate keeper of the calling endpoint includes:

The administrator presets the shared key between the home gate keeper of the calling endpoint and the home gate keeper of the called endpoint and presets the first key derivation algorithm and the first encryption algorithm within the home gate keeper of the called endpoint; the two algorithm rules may be standard ones in the prior art; then the shared key between the calling endpoint and the called endpoint will be processed in the home gate keeper of the called endpoint as follows:

The home gate keeper of the called endpoint controls the random sequence generator to generate the first random sequence; and creates the first clear token Clear Token1;

First, it encrypts the shared key between the home gate keeper of the calling endpoint and the home gate keeper of the called endpoint with the first random sequence on the basis of the first key derivation algorithm, to obtain the first derived key;

Second, it encrypts the shared key between the calling endpoint and the called endpoint with the obtained first derived key on the basis of the first encryption algorithm, to obtain the first encryption result;

Next, it sets the first encryption result, the first random sequence, the first key derivation algorithm and the first encryption algorithm into the respective fields of the first clear token;

Finally, it encapsulates the first clear token into the Location Confirm (LCF) message, and feeds back the LCF message to the home gate keeper of the calling endpoint. In this way, it is achieved that the home gate keeper of the called endpoint encrypted the shared key between the calling endpoint and the called endpoint in the first encryption mode and sent the encrypted data to the home gate keeper of the calling endpoint.

Step S5: the home GK of the calling endpoint decrypts the received encrypted data in the first decryption mode to obtain the shared key between the calling endpoint and the called endpoint; the first decryption process based on the first encryption mode described above is as follows:

The home GK of the calling endpoint reads the first encryption result, the first random sequence, the first key derivation algorithm and the first encryption algorithm in the respective fields of the first clear token in the received LCF message;

The home GK of the calling endpoint performs encryption on the shared key between the home GK of the calling endpoint and the home GK of the called endpoint with the first random sequence on the basis of the first key derivation algorithm, to obtain the first derived key;

Then, the home GK of the calling endpoint performs decryption on the first encryption result with the obtained first derived key on the basis of the first encryption algorithm, to obtain the shared key between the calling endpoint and the called endpoint.

Step S6: the home GK of the calling endpoint encrypts the shared key between the calling endpoint and the called endpoint in the second encryption mode and sends the encrypted data to the calling endpoint; wherein in detail, the process of encrypting the shared key between the calling endpoint and the called endpoint with the second encryption mode, and sending the encrypted data to the calling endpoint includes:

The administrator presets the shared key between the calling endpoint and the home GK of the calling endpoint and presets the second key derivation algorithm and the second encryption algorithm within the home GK of the calling endpoint;

The home GK of the calling endpoint controls the random sequence generator to generate the second random sequence and creates the second clear token Clear Token2;

First, the home GK of the calling endpoint performs encryption on the shared key between the calling endpoint and the home GK of the calling endpoint with the second random sequence on the basis of the second key derivation algorithm, to obtain the second derived key; and The calling endpoint performs encryption again on the shared key between the calling endpoint and the called endpoint with the obtained second derived key on the basis of the second encryption algorithm, to obtain the second encryption result;

Next, the home GK of the calling endpoint sets the second encryption result, the second random sequence, the second key derivation algorithm and the second encryption algorithm described above into the respective fields of the second clear token, respectively; and The calling endpoint encapsulates the second clear token into the Admissions Confirm (ACF) message, and feeds back the ACF message to the calling endpoint.

Step S7: the calling endpoint decrypts the received data in the second decryption mode to obtain the shared key between the calling endpoint and the called endpoint; the second decryption process based on the second encryption mode described above is as follows:

The calling endpoint reads the second encryption result, the second random sequence, the second key derivation algorithm and the second encryption algorithm recorded in the respective fields of the second clear token in the received ACF message;

The calling endpoint encrypts the shared key between the calling endpoint and the home gate keeper of the calling endpoint with the second random sequence on the basis of the second key derivation algorithm, to obtain the second derived key; and The calling endpoint decrypts the second encryption result with the obtained second derived key on the basis of the second encryption algorithm, to obtain the shared key between the calling endpoint and the called endpoint.

Step S8: then the calling endpoint can encrypt the Setup message and the subsequent service messages to be sent to the called endpoint with the shared key between the calling endpoint and the called endpoint obtained in step S7 and ensure that the messages can be sent out only after they are encrypted with the shared key, in order to enhance communication security.

Figure 3:
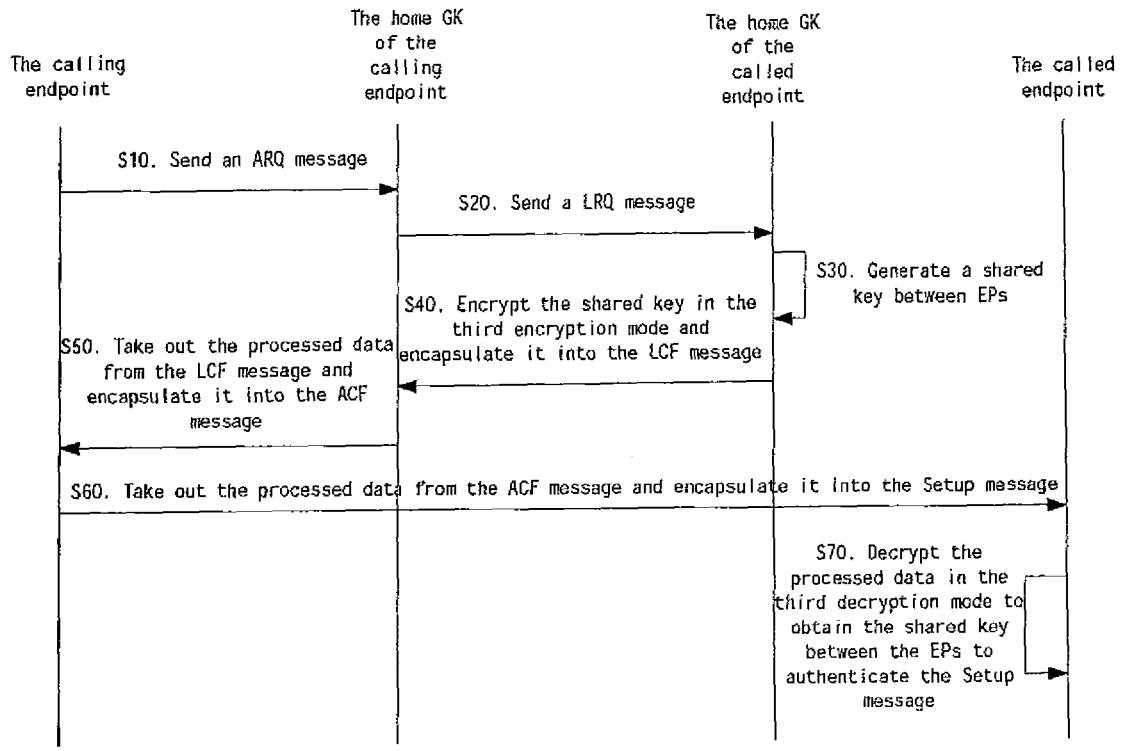
FIG. 3 shows the procedures that the home gate keeper of the called endpoint encrypts the shared key between the calling endpoint and the called endpoint and then sends the encrypted shared key to the called endpoint, and the called endpoint decrypts the encrypted data to obtain the shared key, according to an embodiment of the method of secure communication between endpoints of the present invention.

And, it is needed that the home GK of the called endpoint encrypt the shared key between the calling endpoint and the called endpoint and transmit the encrypted shared key to the called endpoint; the called endpoint in turn utilizes the decrypted shared key to authenticate the Setup message and the subsequent service messages sent from the calling endpoint and check the message's integrity. FIG. 3 shows the procedures in which the home gate keeper of the called endpoint encrypts the shared key between the calling endpoint and the called endpoint and then transmits it to the called endpoint, and the called endpoint in turn decrypts the encrypted data to obtain the corresponding shared key, with the method of secure communication between endpoints according to an embodiment of the present invention; the procedures are as follows:

Step S10: when the calling endpoint is to call an endpoint in a different GK management domain from itself, it generates an Admissions Request (ARQ) message containing called endpoint identification information and then sends the ARQ message to its own home GK;

Step S20: with the called endpoint identification information contained in the ARQ message, the home GK of the calling endpoint locates the GK management domain in which the called endpoint is, and generates a Location Request (LRQ) message containing the called endpoint identification information and sends to the home GK of the called endpoint;

Step S30: after the home GK of the called endpoint receives the LRQ message, it generates the shared key between the calling endpoint and the called endpoint;

Step S40: the home GK of the called endpoint encrypts the shared key between the calling endpoint and the called endpoint in the third encryption mode, and sends the encrypted data to the home gate keeper of the calling endpoint; in detail, the process that the home GK of the called endpoint encrypts the shared key between the calling endpoint and the called endpoint with the third encryption mode, and sends the encrypted data to the home gate keeper of the calling endpoint includes:

The administrator presets a shared key between the called endpoint and the home GK of the called endpoint and presets the third key derivation algorithm and the third encryption algorithm within the home GK of the called endpoint; the two algorithm rules may also be standard ones in the prior art; then the shared key between the calling endpoint and the called endpoint will be processed in the home GK of the called endpoint as follows:

The home GK of the called endpoint controls the random sequence generator to generate the third random sequence and creates the third clear token Clear Token3;

The home GK of the called endpoint performs encryption on the shared key between the called endpoint and the home GK of the called endpoint with the third random sequence on the basis of the third key derivation algorithm, to obtain the third derived key;

The called endpoint performs encryption again on the shared key between the calling endpoint and the called endpoint with the above obtained third derived key on the basis of the third encryption algorithm, to obtain the third encryption result;

Next, the home GK of the called endpoint sets the third encryption result, the third random sequence, the third key derivation algorithm and the third encryption algorithm described above into the respective fields of the third clear token, respectively;

Finally, the third clear token is encapsulated into the LCF message, and feeds back the LCF message to the home gate keeper of the calling endpoint.

Step S50: the home GK of the calling endpoint takes out the third clear token contained in the received LCF message and encapsulates it into the ACF message and feeds back to the calling endpoint;

Step S60: the calling endpoint takes out the third clear token contained in the ACF message, and encapsulates it into the Setup message and sends to the called endpoint.

Step S70: the called endpoint decrypts the received data in the third decryption mode, to obtain the shared key between the calling endpoint and the called endpoint; the third decryption process based on the third encryption described above is as follows:

The called endpoint reads the third encryption result, the third random sequence, the third key derivation algorithm and the third encryption algorithm recorded in the respective fields of the third clear token in the received Setup message;

The called endpoint encrypts the shared key between the called endpoint and the home GK of the called endpoint with the third random sequence on the basis of the third key derivation algorithm, to obtain the third derived key; and The called endpoint decrypts the third encryption result with the third derived key on the basis of the third encryption algorithm, to obtain the shared key between the calling endpoint and the called endpoint;

After the called endpoint obtains the shared key between the calling endpoint and the called endpoint, it can utilize the shared key to authenticate the Setup message and the subsequent service messages sent from the calling endpoint and check the message's integrity.

Wherein, in the encryption/decryption of the shared key between the calling endpoint and the called endpoint with the first encryption/decryption mode, the second encryption/decryption mode and the third encryption/decryption mode, the random sequence used in solving the derived key with the key derivation algorithm is the same as that used in the encryption of the shared key between the calling endpoint and the called endpoint with the encryption algorithm; of course, the two operation processes may also use different random sequences; however, the operation principle is similar and will not be described further here.

Of course, after the calling endpoint and the called endpoint obtain the shared key between themselves, each end can utilize the shared key to encrypt the messages to be sent to the counterpart endpoint and authenticate the messages sent from the counterpart endpoint or check the message's integrity.

Figure 4:
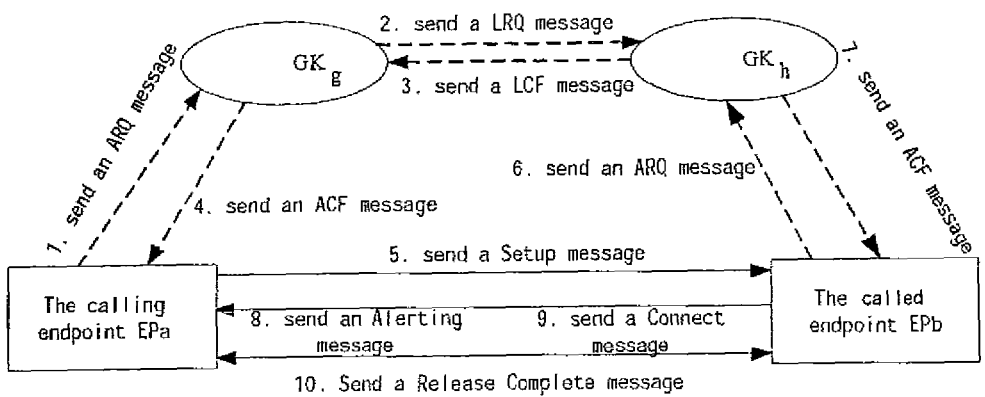
FIG. 4 shows the detailed processing procedures in an embodiment of the method of secure communication between endpoints of the present invention.

Hereinafter, the implementation of the method of secure communication between endpoints according to an embodiment of the present invention is detailed, with H.235 protocol as an example. FIG. 4 shows the processing procedures in an embodiment of the method of secure communication between endpoints of the present invention; in the embodiment, the GK discovery procedure (GRQ/GCF procedure), endpoint registration procedure (RRQ/RCF procedure), and negotiation of security features between endpoint and its home GK, are ignored here; all of them are standard procedures in H.235 protocol without any change, and thus are not described in detail. For detailed information, please see H.235 V3.

In addition, the preconditions of the embodiment include: GK has authenticated the endpoints managed by itself, and the endpoints have authenticated their home GK, so that the endpoints and their home GK trust each other. The home gate keeper GKg of the calling endpoint EPa and the home gate keeper GKh of the called endpoint EPb have authenticated each other, to avoid malicious attacks. Under the above preconditions, security of the RAS messages can be assured substantially between the calling endpoint EPa and the called endpoint EPb.

Meanwhile, the embodiment also requires another precondition: a shared key Kag has been set between the calling endpoint EPa and its home gate keeper GKg; a shared key Kgh has been set between the home GKg of EPa and the home GKh of EPb; and a shared key Kbh has been also set between the called endpoint EPb and its home gate keeper GKh.

In direct routing mode, if Q931 messages are not authenticated between EPa and EPb, it is unable to assure security of the entire calling process, even though the RAS messages between EPa and EPb are secure. Therefore, the core of an embodiment of the present invention is to negotiate a security solution (i.e., the shared key between EPa and EPb) during the secure RAS message interaction process, so that subsequent Q931 messages can be communicated securely between EPa and EPb with the security solution obtained through negotiation (wherein, the procedures in dotted lines in FIG. 4 indicate the RAS message interaction process between endpoints; while the procedures in solid lines indicate the Q931 message interaction process between endpoints). The detailed flow is as follows:

1. ARQ

EPa sends an ARQ message carrying a clear token ClearToken to its home GKg; the tokenOID field in the ClearToken is set to "I0", indicating that EPa supports the Appendix I of H.235 V3; other fields in the ClearToken are void. In addition, the ARQ message also carries EPb identification information.

2. LRQ

After GKg receives the ARQ message sent from EPa, it will know that Epb is not in its management domain according to the EPb identification information contained in the ARQ message (the destinationInfo field or destCallSignalAddress field in ARQ message indicates the EPb identification information), and initiates an LRQ message to GKh to inquire the address of EPb. When GKg converts the ARQ message to LRQ message, it finds that the value of tokenOID field of ClearToken contained in the ARQ message is "I0" and thus knows EPa supports the features defined in Appendix I of H.235 V3, and then GKg also generates a ClearToken in the LRQ message, with the tokenOID field also set to "I0"; other fields in ClearToken are void; the endpointIdentifier field of the LRQ message is set to endpoint ID of calling endpoint EPa, and the destinationInfo field or destCallSignalAddress field of the LRQ message is set to endpoint ID of called endpoint EPb. If GKg doesn't support the features defined in is Appendix I, it is unnecessary to create a ClearToken whose tokenOID field is "I0" in the LRQ message sent out, and the subsequent process will interact by massage in the common communication mode not supporting Appendix I.

3. LCF

After GKh receives the LRQ message, it checks whether the value of tokenOID field of independent ClearToken in the LRQ message is "I0"; if the value of tokenOID field is "I0", it is indicated that the counterpart endpoint supports the features defined in Appendix I. If GKh itself also supports the features defined in Appendix I, it inquires whether the called EPb supports the features defined in Appendix I according to the endpoint ID information of called endpoint EPb provided by the LRQ message.

If both the called endpoint EPb and GKh support the features defined in Appendix I, GKh generates a shared key Kab between EPa and EPb;

Next, GKh generates a random sequence Challenge1, calculates on the shared key Kgh between GKh and GKg and Challenge1 with the predefined key derivation algorithm to obtain the derived key EKgh of Kgh, and then encrypts Kab with the obtained derived key Ekgh and the predefined encryption algorithm to obtain EKab1;

GKh sets EKab1 and encryption parameters (encryption algorithm, initial vector used in encryption, and random sequence, etc.) into the respective subfields of ClearToken.h235Key.secureSharedSecret field of an independent clear token ClearToken, respectively;

If the LRQ message received by GKh contains the endpointIdentifier field, GKh will set the data of this endpointIdentifier field into the ClearToken.h235Key.secureSharedSecret.generalID field of ClearToken;

GKh sets the key derivation algorithm used in solving the derived key Ekgh into ClearToken.h235Key.secureSharedSecret.keyDerivationOID field of the ClearToken and sets Challenge1 used in solving the derived key Ekgh into ClearToken.challenge field of the ClearToken;

The ClearToken.generalID field of the ClearToken is set to endpoint ID information of GKg, the ClearToken.senderID is set to the endpoint ID of GKh, and finally, GKh sets tokenOID field of this ClearToken as "I3"; hereinafter the ClearToken is abbreviated as CT3.

Similarly, GKh operates on the shared key Kbh between GKh and EPb and another Challenge with another key derivation algorithm to obtain the derived key Ekbh, encrypts Kab with the obtained EKbh on the basis of another encryption algorithm to obtain EKab2;

GKh sets the encryption result EKab2 and the encryption parameters (encryption algorithm, initialization vector used in encryption, and random sequence, etc.) into the respective subfields of ClearToken.h235Key.secureSharedSecret field of another clear token ClearToken, respectively;

If the LRQ message received by GKh contains the endpointIdentifier field, GKh will also set the data of that field into h235Key.secureSharedSecret.generalID field of the ClearToken;

The Challenge used in solving the derived key EKbh is set to ClearToken.challenge field, the ClearToken.generalID field is set to endpoint ID of EPb, the ClearToken.senderID field is set to endpoint ID of GKh, and finally, the tokenOID of this ClearToken is set to "I2"; this ClearToken is referred to as CTb in H.235 V3, and thereby CTb is used to represent this ClearToken in the following. GKh sets the above obtained CT3 and CTb into the LCF message, and feeds back the LCF message to GKg.

4. ACF

When GKg receives the LCF message fed back from GKh, it extracts the ClearToken; if more than two ClearTokens are obtained and the tokenOID of one ClearToken is "I3" (i.e., CT3) and the tokenOID of the other ClearToken is "I2" (i.e., CTb), it indicates GKh (including EPb) agrees to use the security solution defined in Appendix I. GKg constructs an ACF message, and creates a new ClearToken whose tokenOID is set to "I1" (this ClearToken is referred to as CTa in H.235 V3, and thereby, hereinafter, it is referred to as CTa); and GKg generates a random Challenge and sets it into CTa.challenge; it decrypts the data of CT3.h235Key.secureSharedSecret.encryptedSessionKey field with the parameters (Challenge, key derivation algorithm, encryption algorithm, initialization vector used in encryption, etc.) provided from CT3 and the shared key Kgh (in practice, the derived key EKgh shall be obtained by operating on Kgh through the key derivation algorithm), to obtain the key Kab; GKg solves the derived key EKag with the shared key Kag between the calling endpoint and the home gate keeper of the calling endpoint as well as the preset key derivation algorithm for operation of the Challenge in CTa.challenge, encrypts Kab with EKag, and sets the encryption result and the encryption parameters into the corresponding subfields in CTa.h235Key.secureSharedSecret, and finally, copies the CTb.generalID information to CTa.h235Key.secureSharedSecret.generalID field; it copies the entire CTb completely into ACF message; if GKh is unable to set CTb.h235Key.secureSharedSecret.generalID field because the endpointIdentifier field is not set in LRQ message received by GKg, GKg need to set endpoint ID of EPa to CTb.h235Key.secureSharedSecret.generalID field; finally, GKg feeds back the ACF message processed as above to EPa.

5. Setup

After EPa receives the ACF message, it extracts CTa and CTb from the ACF message, and similarly, decrypts the data in CTa.h235Key.secureSharedSecret.EncryptedSessionKey field with the information in CTa and the shared key Kag between EPa and GKg (in practice, what is used actually is the derived key EKag), to obtain the key Kab. EPa creates a Setup message, copies the entire CTb in the ACF message into the Setup message, and then utilizes the shared key Kab to set the authentication information described in Appendix D of H.235 V3; EPa sends out the Setup message directly to EPb.

After receiving the Setup message, EPb processes as follows: extracts CTb contained in the Setup message, solves the derived key EKbh of Kbh with the information in CTb.generalID, CTb.sendersID, and CTb.challenge fields, etc. as above, and decrypts the data in CTb.h235Key.secureSharedSecret.EncryptedSessionKey field with the derived key EKbh to obtain the key Kab; and authenticates the Setup message with the obtained Kab.

The subsequent processing procedures are identical to those used in a common calling process in an H.323-based system.

6. EPb Initiates an ARQ request

After EPb successfully authenticates the Setup message sent from EPa with the solved Kab, it initiates an ARQ request to its home GKh.

7. GKh Feeds Back an ACF Message

After GKh receives the ARQ message, if it determines EPb is an endpoint managed by itself, it feeds back an ACF message to EPb.

8. Alerting

After EPb receives the ACF message fed back from GKh, it sends an Alerting message to EPa.

9. Connect

After EPb receives the ACF message fed back from GKh, it also sends a Connect message to EPa.

10. Release Complete

After the communication is accomplished between the endpoints, EPa sends EPb (or EPb sends EPa) a Release Complete message.

When the step 5 above is over, the shared key Kab has been established between EPa and EPb, and then the Setup/Alerting/Connect/Release Complete messages (step 8-10) in a Q931 call process can be performed encryption authentication (or message integrity check) with the shared key Kab by using H.235 standard method, so as to ensure security of Q931 messages in direct routing mode.

Though the present invention is described utilizing a preferred embodiment as above, it should be noted that those skilled in the art can easily make changes and modifications without deviating from the principle of the present invention, and such changes and modifications shall fall into the protection scope of the present invention.

What is claimed is:

1. A method of secure communication between endpoints, for secure communication between endpoints in different gate keeper management domains, comprising:

generating, by a home gate keeper of a called endpoint, a shared key between a calling endpoint and the called endpoint when the calling endpoint is calling the called endpoint;

performing communication between the calling endpoint and the called endpoint based on the shared key;

wherein before the process of generating the shared key between the calling endpoint and the called endpoint, the method further comprises, presetting the shared key between the home gate keeper of the calling endpoint and the home gate keeper of the called endpoint, and presetting a first key derivation algorithm and a first encryption algorithm by the home gate keeper of the called endpoint; and encrypting the shared key in a first encryption mode and sending encrypted data to the home gate keeper of the calling endpoint by the home gate keeper of the called endpoint, wherein encrypting the shared key in a first encryption mode and sending further comprises, generating a first random sequence and a first clear token by the home gate keeper of the called endpoint, encrypting the shared key between the home gate keeper of the calling endpoint and the home gate keeper of the called endpoint with the first random sequence on the basis of the first key derivation algorithm, to obtain a first derived key, encrypting the shared key between the calling endpoint and the called endpoint with the first derived key on the basis of the first encryption algorithm, to obtain a first encryption result, setting the first encryption result, the first random sequence, the first key derivation algorithm and the first encryption algorithm into respective fields of the first clear token, and encapsulating the first clear token into a Location Confirm message, and sending the encapsulated first clear token to the home gate keeper of the calling endpoint.

2. The method of secure communication between endpoints according to claim 1, wherein the process of generating a shared key between a calling endpoint and the called endpoint further comprises:

receiving, by the home gate keeper of the called endpoint, a Location Request message from the home gate keeper of the calling endpoint, wherein the calling endpoint sends an Admissions Request message including identification information to the home gate keeper of the calling endpoint, and the home gate keeper of the calling endpoint generates the Location Request message in response to the Admissions Request message and sends to the home gate keeper of the called endpoint.

3. The method of secure communication between endpoints according to claim 1, further comprising:

transmitting the encrypted shared key to the calling endpoint, by the home gate keeper of the called endpoint;

encrypting, by the calling endpoint, a Setup message addressed to the called endpoint using the shared key; and authenticating, by the called endpoint, the Setup message sent from the calling endpoint by using the shared key.

4. The method of secure communication between endpoints according to claim 3, wherein the process of encrypting, by the calling endpoint, a Setup message addressed to the called endpoint by using the shared key further comprises:

decrypting, by the home gate keeper of the calling endpoint, the received encrypted data in a first decryption mode to obtain the shared key between the calling endpoint and the called endpoint;

encrypting the shared key between the calling endpoint and the called endpoint in a second encryption mode, and sending the encrypted data to the calling endpoint, by the home gate keeper of the calling endpoint; and decrypting, by the calling endpoint, the received encrypted data in a second decryption mode to obtain the shared key between the calling endpoint and the called endpoint.

5. The method of secure communication between endpoints according to claim 4, wherein the process of decrypting by the home gate keeper of the calling endpoint the received encrypted data in a first decryption mode to obtain the shared key between the calling endpoint and the called endpoint further comprises:

reading, by the home gate keeper of the calling endpoint, the first encryption result, the first random sequence, the first key derivation algorithm and the first encryption algorithm from the respective fields of the first clear token in the Location Confirm message;

encrypting the shared key between the home gate keeper of the calling endpoint and the home gate keeper of the called endpoint with the first random sequence on the basis of the first key derivation algorithm, to obtain a first derived key; and decrypting the first encryption result with the first derived key on the basis of the first encryption algorithm, to obtain the shared key between the calling endpoint and the called endpoint.

6. The method of secure communication between endpoints according to claim 4, wherein the process of decrypting, by the calling endpoint, the received encrypted data in a second decryption mode to obtain the shared key between the calling endpoint and the called endpoint further comprises:

reading the second encryption result, the second random sequence, the second key derivation algorithm and the second encryption algorithm recorded in the respective fields of the second clear token in the Admissions Confirm message, by the calling endpoint;

encrypting the shared key between the calling endpoint and the home gate keeper of the calling endpoint with the second random sequence on the basis of the second key derivation algorithm, to obtain the second derived key; and decrypting the second encryption result with the second derived key on the basis of the second encryption algorithm, to obtain the shared key between the calling endpoint and the called endpoint.

7. The method of secure communication between endpoints according to claim 3, wherein the process of encrypting the shared key between the calling endpoint and the called endpoint and transmitting the encrypted shared key to the called endpoint by the home gate keeper of the called endpoint and authenticating by the called endpoint the Setup message sent from the calling endpoint by using the shared key further comprises:

encrypting the shared key between the calling endpoint and the called endpoint in a third encryption mode, and sending the encrypted data to the home gate keeper of the calling endpoint, by the home gate keeper of the called endpoint;

forwarding the encrypted data to the calling endpoint by the home gate keeper of the calling endpoint;

forwarding the encrypted data to the called endpoint by the calling endpoint; and decrypting the received encrypted data in a third decryption mode by the called endpoint, to obtain the shared key between the calling endpoint and the called endpoint.

8. The method of secure communication between endpoints according to claim 7, before the process of generating a shared key between a calling endpoint and the called endpoint, further comprising:
presetting a shared key between the called endpoint and the home gate keeper of the called endpoint; and
presetting a third key derivation algorithm and a third encryption algorithm by the home gate keeper of the called endpoint;
wherein the process of encrypting the shared key between the calling endpoint and the called endpoint in a third encryption mode and sending the encrypted data to the home gate keeper of the calling endpoint by the home gate keeper of the called endpoint further comprises:
generating a third random sequence and a third clear token by the home gate keeper of the called endpoint;
encrypting the shared key between the called endpoint and the home gate keeper of the called endpoint with the third random sequence on the basis of the third key derivation algorithm, to obtain a third derived key;
encrypting the shared key between the calling endpoint and the called endpoint with the third derived key on the basis of the third encryption algorithm, to obtain the third encryption result;
setting the third encryption result, the third random sequence, the third key derivation algorithm and the third encryption algorithm into respective fields of the third clear token; and
encapsulating the third clear token into a Location Confirm message, and feeding the Location Confirm message back to the home gate keeper of the calling endpoint.

9. The method of secure communication between endpoints according to claim 8, wherein
the process of forwarding the encrypted data to the calling endpoint by the home gate keeper of the calling endpoint is performed by encapsulating the third clear token contained in the received Location Confirm message into the Admissions Confirm message which is fed back to the calling endpoint;
the process of forwarding the encrypted data to the called endpoint by the calling endpoint is performed by encapsulating the third clear token contained in the received Admissions Confirm message into the Setup message which is fed back to the called endpoint.

10. The method of secure communication between endpoints according to claim 9, wherein the process of decrypting the received encrypted data in a third decryption mode by the called endpoint, to obtain the shared key between the calling endpoint and the called endpoint further comprises:
reading the third encryption result, the third random sequence, the third key derivation algorithm and the third encryption algorithm recorded in the respective fields of the third clear token in the Setup message, by the called endpoint;
encrypting the shared key between the called endpoint and the home gate keeper of the called endpoint with the third random sequence on the basis of the third key derivation algorithm, to obtain the third derived key; and
decrypting the third encryption result with the third derived key on the basis of the third encryption algorithm, to obtain the shared key between the calling endpoint and the called endpoint.

11. The method of secure communication between endpoints according to claim 1, between the process of generating a shared key between a calling endpoint and the called endpoint and the process of performing communication between the calling endpoint and the called endpoint based on the shared key, further comprising:
sending a Setup message from the calling endpoint to the called endpoint;
authenticating the received Setup message with the shared key, and sending an Admissions Request message to its own home gate keeper in case that the authentication is passed, by the called endpoint;
feeding, by the home gate keeper of the called endpoint, an Admissions Confirm message back to the called endpoint in case of determining the called endpoint as an endpoint managed by itself according to the received Admissions Request message; and
after receiving the Admissions Confirm message, sending an Alerting message and a Connect message from the called endpoint to the calling endpoint.

12. The method of secure communication between endpoints according to claim 1, wherein the process of performing communication between the calling endpoint and the called endpoint based on the shared key further comprises:
encrypting the message addressed to the counterpart endpoint with the shared key by the calling endpoint or called endpoint; and
authenticating the messages sent from the counterpart endpoint and checking the integrity of the message with the shared key.

13. The method of secure communication between endpoints according to claim 1, after the process of performing communication between the calling endpoint and the called endpoint based on the shared key, further comprising: transmitting a Release Complete message between the calling endpoint and the called endpoint.

14. A method for secure communication between endpoints according to claim 1, the method further comprising:
sending, by the home gate keeper of the called endpoint, the shared key to the home gate keeper of the calling endpoint, wherein the shared key is used for the calling endpoint and the called endpoint communicating with each other based thereon thereafter.

15. The method of secure communication between endpoints according to claim 14, wherein the secure communication is based on H.323 protocol.

16. A system for secure communication between endpoints respectively in different gate keeper management domains, comprising
a home gate keeper of a called endpoint, wherein the home gate keeper of the called endpoint includes a hardware processor operable for executing instructions stored in a memory, and is in communication with a home gate keeper of a calling endpoint, and wherein when the hardware processor executes one or more of the stored instructions it causes the home gate keeper of the called endpoint to:
receive a Location Request message from the home gate keeper of the calling endpoint;
generate a shared key between the calling endpoint and the called endpoint in response to the Location Request message;
send the shared key to the home gate keeper of the calling endpoint, wherein the shared key is used for the calling endpoint and the called endpoint communicating with each other based thereon thereafter;

preset a second shared key between the home gate keeper of the calling endpoint and the home gate keeper of the called endpoint;
preset a first key derivation algorithm and a first encryption algorithm;
generate a first random sequence and a first clear token;
encrypt the second shared key with the first random sequence on the basis of the first key derivation algorithm to obtain a first derived key;
encrypt the shared key with the first derived key on the basis of the first encryption algorithm to obtain a first encryption result;
set the first encryption result, the first random sequence, the first key derivation algorithm and the first encryption algorithm into respective fields of the first clear token;
encapsulate the first clear token into a Location Confirm message; and
send the encapsulated first clear token back to the home gate keeper of the calling endpoint.

17. The system according to claim 16, wherein the system is an H.323 protocol based multimedia communication system.

* * * * *